(12) United States Patent
Abraham et al.

(10) Patent No.: US 8,553,411 B2
(45) Date of Patent: Oct. 8, 2013

(54) COMPUTER CHASSIS

(75) Inventors: Benjamin Abraham, Cupertino, CA (US); John J. Briden, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 302 days.

(21) Appl. No.: 12/991,693

(22) PCT Filed: May 23, 2008

(86) PCT No.: PCT/US2008/064654
§ 371 (c)(1),
(2), (4) Date: Nov. 8, 2010

(87) PCT Pub. No.: WO2009/142644
PCT Pub. Date: Nov. 26, 2009

(65) Prior Publication Data
US 2011/0058330 A1 Mar. 10, 2011

(51) Int. Cl.
*G06F 1/20* (2006.01)
*H05K 5/00* (2006.01)
*H05K 7/20* (2006.01)

(52) U.S. Cl.
USPC .................................. 361/679.49; 361/679.47

(58) Field of Classification Search
USPC ........................................ 361/679.46–679.54
See application file for complete search history.

(56) References Cited

U.S. PATENT DOCUMENTS

| | | | | |
|---|---|---|---|---|
| 4,029,373 A * | 6/1977 | Jones et al. | ..................... | 439/59 |
| 4,748,540 A * | 5/1988 | Henneberg et al. | ...... | 361/679.46 |
| 5,414,591 A * | 5/1995 | Kimura et al. | ................ | 361/695 |
| 5,473,507 A * | 12/1995 | Schwegler et al. | ........... | 361/690 |
| 5,493,457 A * | 2/1996 | Kawamura et al. | ........... | 720/648 |
| 5,673,029 A * | 9/1997 | Behl et al. | ..................... | 340/635 |
| 5,691,883 A * | 11/1997 | Nelson | .......................... | 361/697 |
| 5,813,243 A | 9/1998 | Johnson | | |
| 5,949,646 A * | 9/1999 | Lee et al. | ....................... | 361/695 |
| 5,978,217 A * | 11/1999 | Kerrigan et al. | .............. | 361/694 |
| 6,038,129 A * | 3/2000 | Falaki et al. | ................... | 361/699 |
| 6,104,003 A * | 8/2000 | Jones | ............................ | 219/400 |
| 6,134,107 A * | 10/2000 | Kerrigan et al. | .............. | 361/694 |
| 6,186,890 B1 * | 2/2001 | French et al. | ................. | 454/184 |
| 6,324,056 B1 | 11/2001 | Breier | | |
| 6,356,435 B1 * | 3/2002 | Davis et al. | .................... | 361/678 |
| 6,400,567 B1 * | 6/2002 | McKeen et al. | ............... | 361/695 |
| 6,422,730 B1 * | 7/2002 | Koren et al. | ................... | 362/580 |
| 6,430,041 B1 * | 8/2002 | Johnson et al. | .......... | 361/679.48 |
| 6,496,366 B1 * | 12/2002 | Coglitore et al. | ........ | 361/679.46 |
| 6,542,362 B2 * | 4/2003 | Lajara et al. | .............. | 361/679.48 |
| 6,595,018 B2 * | 7/2003 | Goth et al. | .................... | 62/259.2 |
| 6,597,569 B1 * | 7/2003 | Unrein | ........................ | 361/679.4 |
| 6,650,535 B1 * | 11/2003 | Moss et al. | ............... | 361/679.33 |
| 6,742,583 B2 * | 6/2004 | Tikka | ............................ | 165/291 |

(Continued)

*Primary Examiner* — Adrian S Wilson

(57) ABSTRACT

A computer chassis is provided. The computer chassis includes a housing having a first closed compartment with a first heat sink having a first heat dissipating surface formed on one side of the first closed compartment; and a second closed compartment having a second heat sink with a second heat dissipating surface formed on one side of the second closed compartment. The first and second compartments are substantially isolated from air flow within the housing. The housing, the first closed compartment and the second closed compartment are configured to define an air passage way between the housing, the first heat dissipating surface and the second heat dissipating surface. This air passage way forms a chimney effect that aids in cooling and promotes natural air convection.

18 Claims, 3 Drawing Sheets

(56) References Cited

U.S. PATENT DOCUMENTS

| | | | |
|---|---|---|---|
| 6,889,752 B2 * | 5/2005 | Stoller | 165/47 |
| 6,951,513 B1 * | 10/2005 | Greenslade et al. | 454/184 |
| 7,068,509 B2 * | 6/2006 | Bash et al. | 361/700 |
| 7,108,051 B2 * | 9/2006 | Hung | 165/122 |
| 7,245,486 B2 * | 7/2007 | Kumano et al. | 361/679.48 |
| 7,315,457 B1 * | 1/2008 | Chen | 361/801 |
| 7,379,299 B2 * | 5/2008 | Walsh et al. | 361/695 |
| 7,434,412 B1 * | 10/2008 | Miyahira | 62/115 |
| RE40,630 E * | 1/2009 | McEwan et al. | 454/184 |
| 7,508,663 B2 * | 3/2009 | Coglitore | 361/695 |
| 2002/0024795 A1 * | 2/2002 | Bhatia et al. | 361/687 |
| 2003/0035268 A1 * | 2/2003 | Coglitore et al. | 361/687 |
| 2003/0117772 A1 | 6/2003 | Searls | |
| 2004/0085727 A1 * | 5/2004 | Kim | 361/687 |
| 2004/0196624 A1 * | 10/2004 | Kobayashi et al. | 361/683 |
| 2005/0168938 A1 * | 8/2005 | Bash et al. | 361/687 |
| 2005/0259392 A1 * | 11/2005 | Vinson et al. | 361/687 |
| 2006/0002084 A1 * | 1/2006 | Wei | 361/695 |
| 2006/0044775 A1 * | 3/2006 | Hoshino et al. | 361/796 |
| 2006/0075509 A1 * | 4/2006 | Kishon | 726/34 |
| 2006/0120045 A1 * | 6/2006 | Van Der Werff | 361/697 |
| 2006/0176664 A1 | 8/2006 | Casebolt | |
| 2006/0198112 A1 * | 9/2006 | Miller et al. | 361/752 |
| 2007/0109741 A1 * | 5/2007 | Seibold | 361/687 |
| 2008/0007911 A1 * | 1/2008 | Hallin et al. | 361/687 |
| 2008/0024999 A1 * | 1/2008 | Huang | 361/724 |
| 2008/0043405 A1 * | 2/2008 | Lee et al. | 361/600 |
| 2009/0256512 A1 * | 10/2009 | Begun et al. | 318/471 |

\* cited by examiner

COMPUTER CHASSIS

TECHNICAL FIELD

The present invention relates to computer chassis, and more particularly, to a computer chassis having closed compartments.

BACKGROUND

Most computer chassis include a motherboard and storage drives in the same compartment with a fan that drives the air flow from the ambient air through the chassis. This arrangement can lead to an accumulation of dust on top of the electronic components. The accumulated dust may hinder the cooling effect of the air flow and cause the computer to overheat. The accumulated dust may also absorb moisture from the ambient air and form unwanted conductive paths that lead to short circuits and malfunction. Therefore, the computer chassis needs to be opened and cleaned periodically. The cleaning process exposes the electronic components to potential mechanical damage and/or electrostatic discharge (ESD) damage.

SUMMARY

A computer chassis is disclosed. The computer chassis includes a first closed compartment having a first heat sink with a first heat dissipating surface formed on one side of the first closed compartment and a second closed compartment having a second heat sink with a second heat dissipating surface formed on one side of the second dosed compartment. The computer chassis, the first closed compartment and the second closed compartment are configured to define an air passage way between the computer chassis, the first heat dissipating surface and the second heat dissipating surface and to create a chimney effect in the air passage way.

Also disclosed is a computer chassis that includes a first compartment adapted to house a computer motherboard and a second compartment adapted to house one or more computer drives. The first and second compartments are substantially isolated from ambient air flowing into the compartments.

DETAIL DESCRIPTION OF PREFERRED EMBODIMENT

Figure 1:
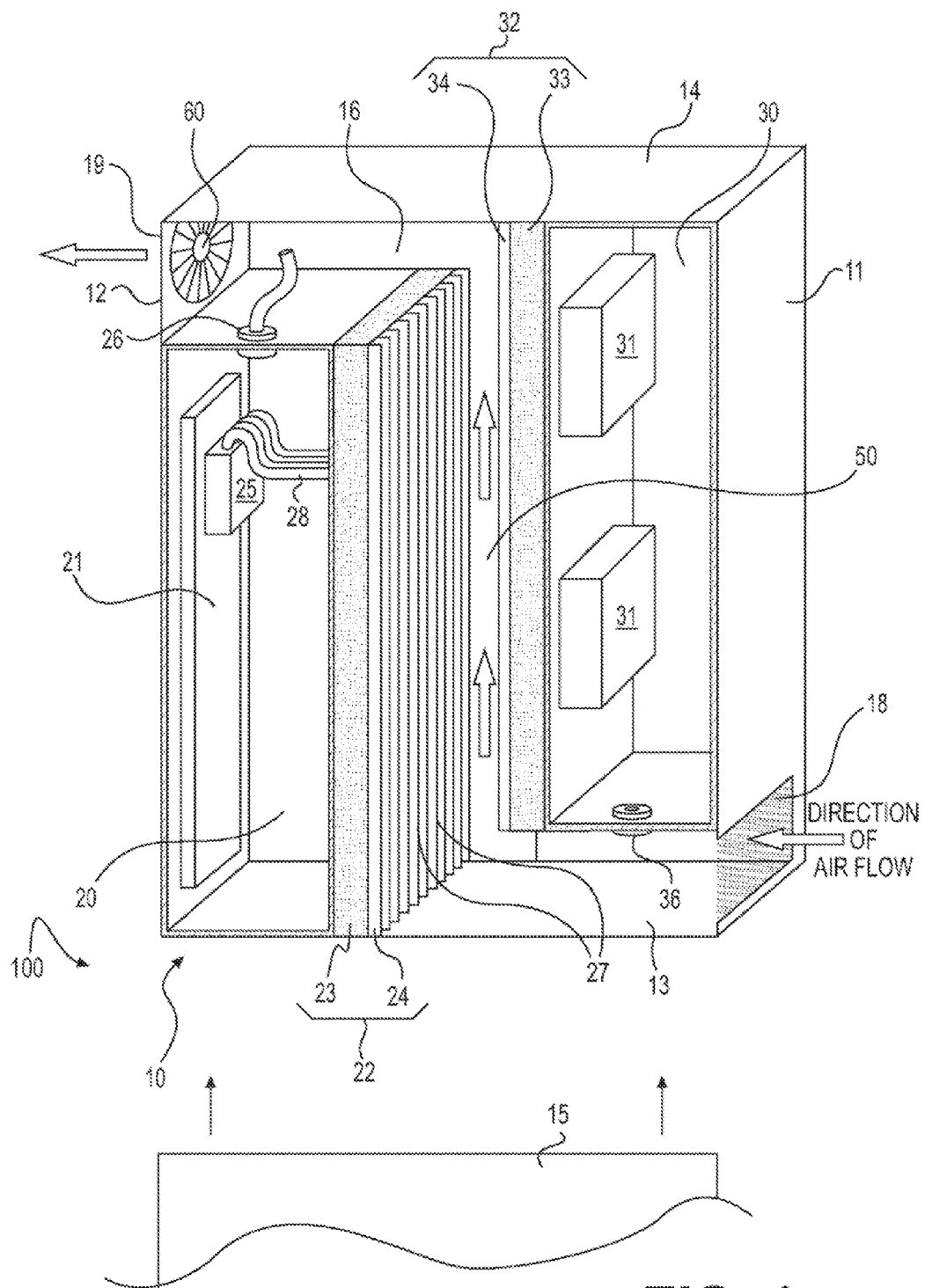
FIG. 1 is an exploded perspective view of a computer chassis with two closed compartments.

This description is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "front," "back," "up," "down," "top" and "bottom," as well as derivatives thereof, should be construed to refer to the orientation as then described or as shown in the drawing figure under discussion. These relative terms are for convenience of description and normally are not intended to require a particular orientation. Terms concerning attachments, coupling and the like, such as "connected" and "attached," refer to a relationship wherein structures are secured or attached to one another either directly or indirectly through intervening structures, as well as both movable or rigid attachments or relationships, unless expressly described otherwise.

Referring to FIG. 1, a computer chassis 100 includes a housing 10 that encloses a first closed compartment 20 and a second closed compartment 30. The housing 10 includes a front panel 15, a back panel 16, a bottom panel 13, a top panel 14, and two side panels 11 and 12. The front panel 15 is generally parallel to the back panel 16. The bottom panel 13 is generally parallel to the top panel 14. The side panels 11 and 12 are parallel to each other and are generally perpendicular to the front panel 15, back panel 16, bottom panel 13, and top panel 14. The front panel 15 or the back panel 16 may be removable so as to provide access to the interior space of the housing 10. The front panel 15 may have one or more openings (not shown) for use access to optical disk drives, multi-media drives, or USB ports.

The closed compartments 20 and 30 are formed on the side panel 12 and 11, respectively. The closed compartments are designed to fit around key components of the computer, such as the motherboard and drives. The closed compartments isolate the key components from air flow within the computer chassis 100 and hence prevent the accumulation of dust on the key components. The closed compartments 20 and 30 can be made of a variety of materials, such as plastics, metals and alloys. The closed compartments 20 and 30 are considered dust-proof if the compartments are substantially closed on all sides and edges. The closed compartments 20 and 30, however, may contain one or more grommets 26 and 36, respectively, to allow cable connections between the computer components inside the compartments and the computer components outside the compartments. The positions of the grommets 26 and 36 are application dependent.

In the embodiment shown in FIG. 1, the closed compartment 20 houses a motherboard 21. A heat sink 22 serves as one site of compartment 20 to improve the rate of heat dissipation from motherboard components or other components within the closed compartment 20. In this embodiment, the heat sink 22 includes a base plate 23 and a heat dissipating surface 24. The heat dissipating surface 24 further includes heat dissipating fins 27 arranged in parallel to the direction of airflow. The base plate 23 and fins 27 are made of materials with a high thermal conductivity, such as a metal or alloy. In one embodiment, the base plate 23 and fins 27 are made of solid copper or aluminum. In another embodiment, the base plate 23 and 33 are hollow-centered metal plates.

In another embodiment, the motherboard components that generate the most heat, such as the central processing unit (CPU) 25 and related circuitry that supports the CPU (CHIPSET) (not shown), are attached to the base plate 23 of the heat sink 22 through heat pipes 28 to facilitate heat transfer to heat sink 22. A heat pipe is a fast heat transfer mechanism that can quickly transport large quantities of heat with a very small difference in temperature between a hot interface and a cold interface. A typical heat pipe contains a sealed hollow tube made of thermo conductive metal, such as copper or aluminum, and an evaporable working fluid inside the hollow tube. The working fluid turns to vapor at the hot interface and the vapor naturally flows and condenses on the cold interface. The condensed working fluid falls or is moved back to the hot interface to evaporate again and repeat the cycle. A wick structure may be placed on the internal side of the tube's side-walls to drive the condensed working fluid back to the hot interface by capillary force.

Closed compartment 30 houses one or more drives 31. Examples of the drives 31 include, but are not limited to, hard disk drives, optical disk drives and multi-media drives. Similar to the closed compartment 20, a heat sink 32 serves as one side of closed compartment 30 to improve the rate of heat dissipation from the drives. In this embodiment, the heat sink 32 comprises a base plate 33 and a heat dissipating surface 34. The heat dissipating surface 34 contains heat dissipating fins (not shown) arranged in parallel to the direction of airflow. In one embodiment, one or more drives 31 are attached to the base plate 33 of the heat sink 32 through heat pipes to facilitate heat dissipation.

The closed compartments 20 and 30 are arranged in such a configuration that the heat dissipating surfaces 24 and 34 of the heat sinks 22 and 32, respectively, are facing each other to form a chimney-like air passage way 50 inside the computer chassis 100. The air passage way 50, combined with two openings on the computer chassis 100: air inlet 18 at the lower portion of the computer chassis 100 and air outlet 12 at the upper portion of the computer chassis 100, generates a chimney effect that promotes air movement within the computer chassis 100 by natural convection of hot air moving from a lower space to an upper space. Briefly, the air passage way 50 functions as a chimney. Because of the heat dissipated from the heat dissipating surfaces 24 and 34, the air inside the air passage way 50 is much hotter than the ambient outside air and therefore less dense than the ambient air. The difference in air density causes the bottom of the vertical column of the air in the air passage way 50 to have a lower pressure than the pressure of outside air at the corresponding position. The higher pressure outside the air passage way 50 is the driving force that moves the air inside the air passage way 50 up and out of the computer chassis 100 through the air outlet 19. The movement or flow of air creates a draft to pull cold air into the computer chassis 100 through the air inlet 18 at the bottom of the computer chassis 100. As the cold air flows through the air passage way 50, heat is dissipated more efficiently from the heat dissipating surfaces 24 and 34. The taller the air passage way 50, the more draught or draft is created.

The air passage way 50 is configured to provide the correct amount of natural draught or draft. A number of design factors, such as the amount of heat that will be generated by the computer components, the internal space of the housing 10, and the arrangement of different computer components, are considered. The relative positions of the heat dissipating surfaces 24 and 34 are application dependent. The optimal positioning of the heat dissipating surfaces 24 and 34 may be determined experimentally for a particular application.

As a "first guess" approximation, the following equation can be used to estimate the natural draught/draft flow rate by assuming that the frictional pressure and heat losses are negligible:

$$Q = CA\sqrt{2gH\frac{Ti-Te}{Ti}}$$

where:
Q=chimney draught/draft flow rate, m³/s,
A=cross-sectional area of chimney, m² (assuming it has a constant cross-section),
C=discharge coefficient (usually taken to be from 0.65 to 0.70),
g=gravitational acceleration, 9.807 m/s²,
H=height of chimney (m),
Ti=average temperature inside the chimney (K),
Te=external air temperature (K).

A person skilled in the art of mechanical design can use well known software simulation tools to determine the mechanical and thermal parameters of the heat plates, heat pipes, fan speed and other parameters for a required application.

For computers with low-power CPUs, the chimney effect may generate sufficient airflow to allow a quiet and energy-efficient fan-less design. For computers with high-power CPUs, a fan 60 may be complementarily positioned to accelerate airflow through the air passage way 50 and increase the rate of heat dissipation. This chimney effect in the air passage way aids in cooling and promotes natural air convection that enables a reduction in the fan speed. Although FIG. 1 shows a fan 60 located at the air outlet opening 19, a person of ordinary skill in the art would understand that the exact complementary positioning is application dependent, and may be affected by a number of factors, including but not limited to, the amount of heat to be removed, the volume and velocity of the airflow, and so forth. The optimal complementary positioning for a particular application of flow provider and flow modifier may be determined empirically. In one embodiment, the fan 60 is controlled by a thermostat. In another embodiment, the thermostat has sensors in both compartments 20 and 30. The fan 60 is turned on when temperature in compartment 20 or 30 reaches a predetermined level.

Figure 2:
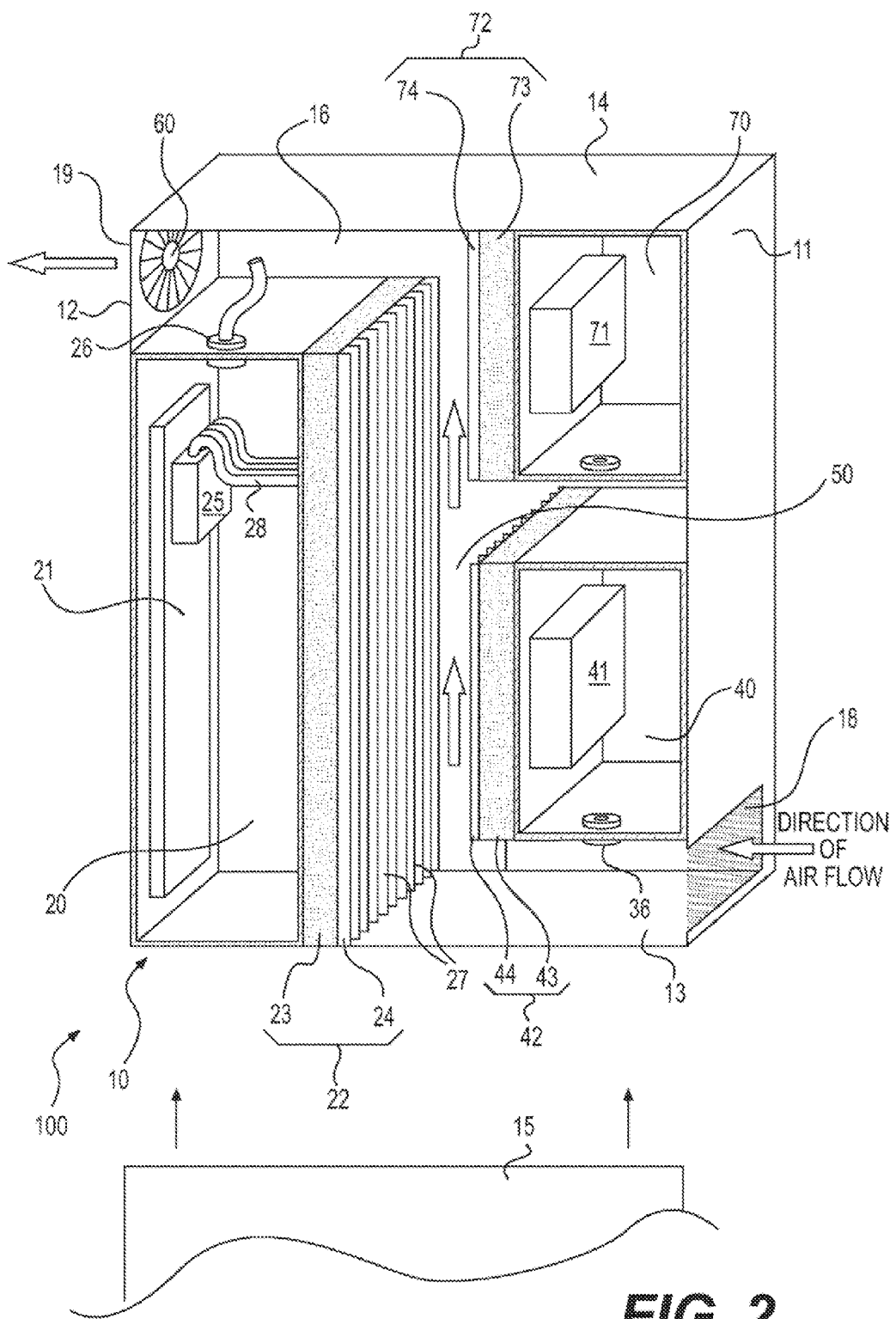
FIG. 2 is an exploded perspective view of a computer chassis with three closed compartments.

In addition to the closed compartments 20 and 30, the housing 10 may contain one or more closed compartments to house other components of the computer. Referring now to FIG. 2, the housing 10 includes a first closed compartment 20 to house the motherboard 21, a second closed compartments 40 to house a hard disk drive 41, and a third closed compartment 70 to house an optical disk drive 71. Examples of the optical disk drive 71 include, but are not limited to, a CD drive, a DVD drive, and a CD/DVD drive. Each of the closed compartments 40 and 70 has its own heat sink 42 and 72, respectively, so that the drives 41 and 71 do not heat each other. Similar to the configuration in FIG. 1, each of the heat sink 42 and 72 contains a base plate (43 and 73) and a heat dissipating, surface (44 and 74) with fins. The heat dissipating surfaces 24, 44 and 74 are positioned to create a chimney effect in the air passage way 50.

Figure 3:
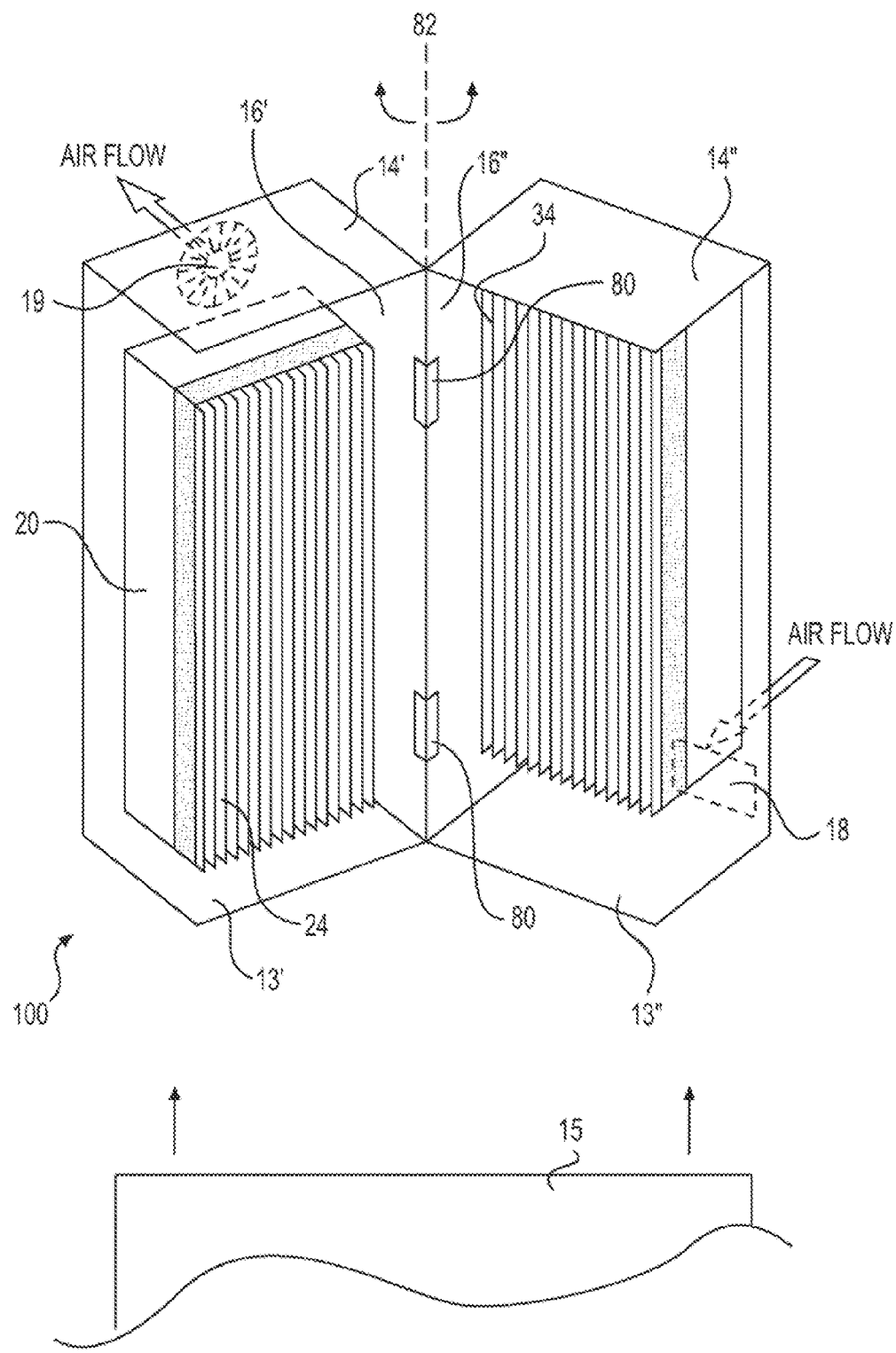
FIG. 3 is an exploded perspective view of a computer chassis with hinges on the back panel.

In another embodiment, the back panel of the housing 10 contains one or more hinges 80. As shown in FIG. 3, after removing the front panel 15, the housing 10 can be pivoted open along the axis 82 to allow easy access to the heat dissipating surface 24 and 34 if cleaning of the fins of the heat dissipating surfaces is required. In this embodiment, the top panel and the bottom panel each consists of two subpanels (14', 14" and 13', 13"). The back panel also consists of two subpanels 16' and 16", which are connected to each other through the hinges 80. In yet another embodiment, one or more of the closed compartments 20, 30, 40 and 70 are mounted on slidable brackets (not shown) and can be slid out of the computer chassis 100 for cleaning of the fins of the heat dissipating surfaces.

The motherboard 21, as well as drives 31, 41 and 71, can be attached either to the computer chassis 100, or to the compartments 20 and 30, respectively, through retaining mechanisms well known to one skilled in the art, such as screws and holding brackets.

In an embodiment, the computer chassis 100 is placed inside a dust-proof enclosure with specialized filtration and positive pressure to further prevent dust and other airborne particulates from entering and damaging key components of the computer. Dust-proof enclosures are commercially available at, for example, Dust Free PC, LLC in Jacksonville. Fla.

While the invention has been described in connection with what is presently considered to be the most practical and preferred embodiment, it is to be understood that the invention is not limited to the disclosed embodiments, but, on the contrary, is intended to accommodate various modifications and equivalent arrangements. It will be appreciated by those of ordinary skill in the art that a wide variety of alternate and/or equivalent embodiments or implementations calculated to achieve the same purposes may be substituted for the embodiments shown and described. This application is intended to cover any adaptations or variations of the embodiments discussed herein. Therefore, it is manifestly intended that embodiments in accordance with the present invention be limited only by the claims and the equivalents thereof.

What is claimed is:

1. A computer chassis comprising:
    a first closed compartment having a first heat sink with a first heat dissipating surface formed on one side of said first closed compartment; and
    a second closed compartment having a second heat sink with a second heat dissipating surface formed on one side of said second closed compartment,
    wherein said first and second closed compartments are substantially closed to air circulation within said computer chassis, and wherein said computer chassis, said first closed compartment and said second closed compartment are configured to define an air passage way between said computer chassis, said first heat dissipating surface and said second heat dissipating surface and to create a chimney effect in said air passage way.

2. The computer chassis of claim 1, wherein said first closed compartment is adapted to house a computer motherboard.

3. The computer chassis of claim 2, wherein said second closed compartment is adapted to house one or more computer drives.

4. The computer chassis of claim 3, wherein said computer drives include hard disk drives, optical disk drives and multimedia drives.

5. The computer chassis of claim 1, wherein said first and said second heat dissipating surfaces each comprises heat dissipating fins arranged in parallel to the direction of airflow.

6. The computer chassis of claim 1, wherein said first closed compartment and said second closed compartment each comprises a grommet.

7. The computer chassis of claim 1, wherein said first compartment further comprises a heat pipe connecting a component of said motherboard to said first heat sink.

8. The computer chassis of claim 7, wherein said component is a CPU or a CHIPSET.

9. The computer chassis of claim 1, further comprising two side panels, a bottom panel, a top panel, a removable front panel and a back panel.

10. The computer chassis of claim 9, wherein said bottom panel, said top panel and said back panel each comprises two subpanels, wherein said subpanels in said back panel are connected to each other by one or more hinges, and wherein said computer chassis can be pivoted open along the hinges to allow aces to said heat dissipating surfaces.

11. The computer chassis of claim 1, further comprising an air inlet and an air outlet.

12. The computer chassis of claim 1, further comprising a fan.

13. The computer chassis of claim 12, wherein said fan is controlled by a thermostat.

14. A computer chassis comprising:
    a first compartment adapted to house a computer motherboard; said first compartment having a first heat sink with a first heat dissipating surface formed on one side of said first compartment;
    a second compartment adapted to house a first computer drive, said second compartment having, a second heat sink with a second heat dissipating surface formed on one side of said second compartment; and
    a third compartment adapted to house a second computer drive, said third compartment having a third heat sink with a third heat dissipating surface formed on one side of said third compartment,
    wherein said first, second and third compartments are substantially closed to air circulation within said computer chassis, and wherein said computer chassis is configured to define an air passage way between said computer chassis, said first heat dissipating surface, said second heat dissipating surface, and said third heat dissipating surface; and
    wherein said air passage way is configured to create a chimney effect.

15. The computer chassis of claim 14, wherein said first computer drive is a hard disk drive and wherein said second computer drive is an optical disk drive or a multi-media drive.

16. The computer chassis of claim 14, wherein each of said first, second and third closed compartments comprises a grommet.

17. A method for configuring a computer chassis, comprising:
    providing a first closed compartment within said computer chassis, said first closed compartment having a first heat sink with a first heat dissipating surface formed on one side of said first closed compartment;
    providing a second closed compartment within said computer chassis, said second closed compartment having a second heat sink with a second heat dissipating surface formed on one side of said second closed compartment; and
    arranging said first closed, compartment and said second closed compartment to define an air passage way between said computer chassis, said first heat dissipating surface and said second heat dissipating surface,
    wherein said air passage way is configured to create a chimney effect and said first and second closed compartments are substantially closed to air circulation within said computer chassis.

18. The method of claim 17, further comprising: providing a fan to accelerate airflow through said air passage way.

* * * * *